March 19, 1974   E. L. GALLE   3,798,338
METHOD FOR APPLYING THERMOPLASTIC COATINGS TO
FOOD AND PHARMACEUTICAL PRODUCTS
Filed May 30, 1972

United States Patent Office 3,798,338
Patented Mar. 19, 1974

3,798,338
METHOD FOR APPLYING THERMOPLASTIC COATINGS TO FOOD AND PHARMACEUTICAL PRODUCTS
Edward L. Galle, St. Paul, Minn., assignor to The Pillsbury Company, Minneapolis, Minn.
Filed May 30, 1972, Ser. No. 258,139
Int. Cl. A23b 7/00; A23g 3/00; A23l 1/00
U.S. Cl. 426—307
4 Claims

ABSTRACT OF THE DISCLOSURE

Thermoplastic protective or moisture resistant coatings, e.g. hydrogenated vegetable oil, are applied to a food product by metering the food product and the thermoplastic coating into a coating zone, maintaining the thermoplastic coating material in a liquid consistency in the coating zone while minimizing the heating of the food product to thereby establish a temperature differential between the coating and the food product and agitating the food product to spread the heated liquid coating over the surface of the food product as a continuous film and allowing the liquid to congeal on the surface of the food product. Typically, heat is applied to the outside surface of a rotating coating cylinder to heat or maintain the coating material in a liquid condition by conduction.

FIELD OF THE INVENTION

This invention relates to the application of thermoplastic coatings to foods and pharmaceutical products hereinafter referred to collectively as edible products.

THE PRIOR ART

The general purpose of the invention is to provide a uniform substantially pinhole free thin protective coating to the surface of food products such as fruit, vegetables, nut meats, simulated food products including simulated fruit bits, simulated nut meats, pharmaceuticals and the like with provision for controlling the amount applied to an accuracy of ±5% (weight basis of the coating material). Previous systems which relied upon dipping followed by centrifuging to remove excess coating do not have the required coating weight control tolerance and unnecessarily heat the product to be coated which may damage or impair the flavor of some foods particularly those with a delicate taste or aroma. Other prior systems such as spraying often do not apply the coating material uniformly to the surface. This is especially true if the surfaces are either porous or have an irregular contour. Auger type coaters have been previously used but are subject to becoming clogged with coating material which solidifies upon cool surfaces often in the inlet area of the machine. This makes it necessary to frequently disassemble the machine for cleaning.

It has also been previously proposed to apply coating material to foods by supplying hot air to the coating chamber for heating. A disadvantage of this system is the similarity of the heating rate for the food product and the coating material being heated.

OBJECTS OF THE INVENTION

The major objects of the invention are: (a) to continuously apply a uniform substantially continuous thin coating of thermoplastic material such as normally solid hydrogenated vegetable oil to a variety of food products (b) to reliably apply about 5 parts of coating to about 95 parts of the material to be coated with a coating weight control tolerance of ±5% (coating material weight basis) (c) to maintain uniformity in the distribution of the coating on the surface of the pieces being coated (d) to protect delicate flavors by controlling the heating of the food pieces (e) to prevent loss of excess coating from the outlet of the processing apparatus (f) to provide a coating system which facilitates cleaning and does not become clogged with solidified coating material.

THE FIGURES

Figure 1:
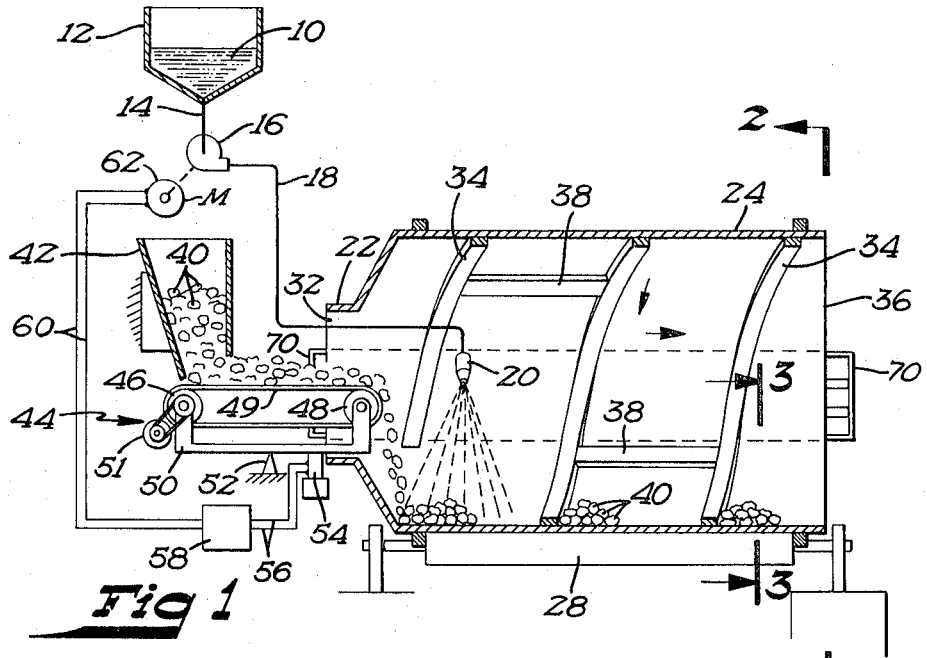
Figure 2:
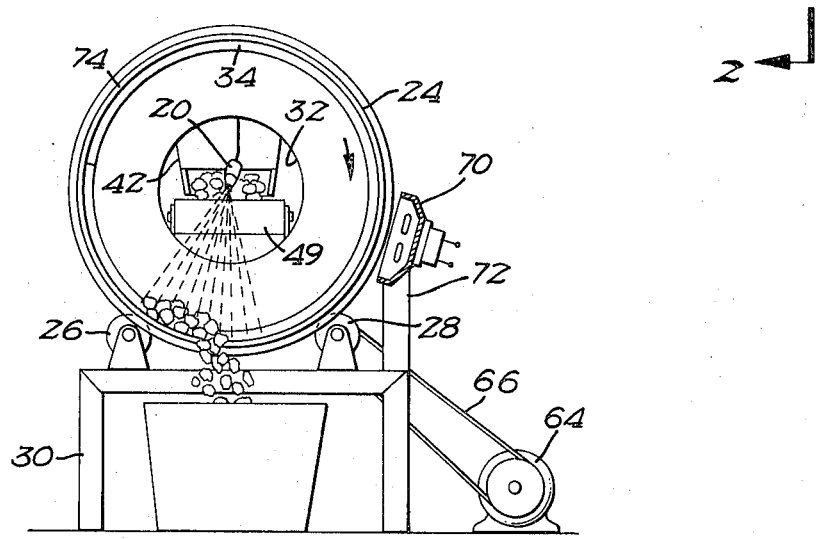
Figure 3:
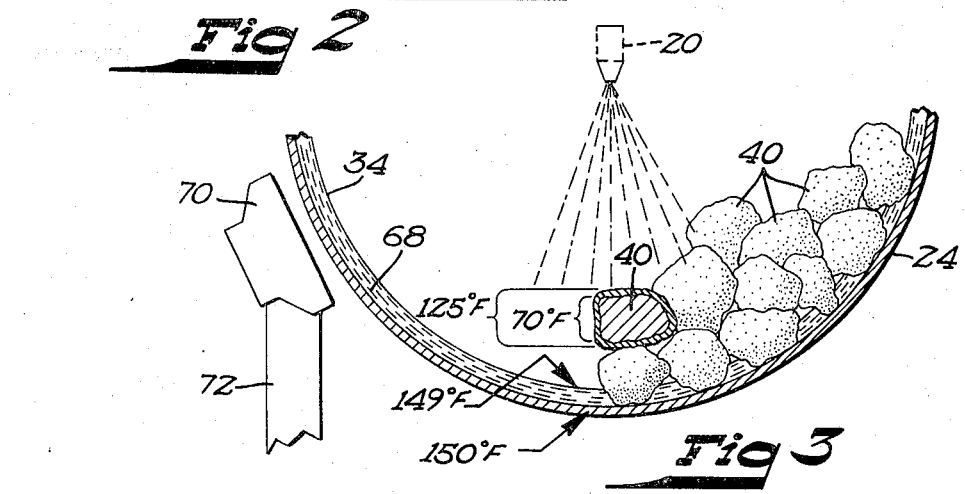

FIG. 1 is a semidiagrammatic vertical sectional view of an apparatus embodying the invention.
FIG. 2 is a sectional view taken on line 2—2 of FIG. 1.
FIG. 3 is an enlarged partial section taken on line 3—3 of FIG. 1.

SUMMARY OF THE INVENTION

Briefly, thermoplastic protective or moisture resistant coatings, e.g. hydrogenated vegetable oil, are applied to a food product by metering the food product and the thermoplastic coating into a coating zone, heating or maintaining the thermoplastic coating in a liquid consistency in the coating zone while minimizing the heating of the food product to thereby maintain a temperature differential and agitating the food product to spread the heated liquid over the surface of the food product to thereby form a continuous film and allowing the liquid to congeal on the surface of the pieces. Typically, heat is applied to the outside surface of a rotating coating cylinder to heat the coating material or maintain already heated coating material in a liquid condition by conduction while limiting the heating of the food pieces. In one preferred form of the invention, the coating is liquefied before being supplied to the coating zone.

THE PREFERRED EMBODIMENT

One application of the invention is in coating food bits such as simulated nut meats, fruit bits, food prices of other kinds and pharmaceutical products of the type which require a protective coating. An excellent protective coating both for the purpose of preserving flavor and protecting the pieces from moisture is a hydrogenated vegetable oil having a softening range of between about 125° and 145° F.

To begin the coating operation, which will be described with reference to the figures, the normally solid hydrogenated vegetable oil 10 is placed in a receptacle 12 heated until liquid and is pumped through an outlet pipe 14 by metering pump 16 at a precisely controlled rate through line 18 to a sprayhead 20. The temperature of the vegetable oil at the sprayhead, in this case is about 150° F. The sprayhead 20 is positioned near the inlet end 22 of a horizontally disposed thin walled coating drum 24 which is mounted for rotation upon horizontally disposed laterally spaced support rolls 26 and 28 which are themselves journaled for rotation upon a supporting framework 30. The drum 24 is provided with an inlet 32 of reduced diameter, an internal helical flight 34 for advancing the product from the inlet end 32 to the outlet end 36 and a number of transversely extending tumbling bars 38 to elevate the pieces and cause them to tumble over themselves to distribute the coating uniformly over their surfaces.

The pieces 40 of the product that are to be coated are placed in a supply hopper 42 suitably mounted above a gravimetric belt feeder indicated generally at 44 that includes a pair of longitudinally spaced horizontally disposed and laterally extending support rolls 46 and 48 which are journaled for rotation on a beam 50 which is itself mounted for pivotal movement on a bearing 52 in proximity with a load sensing cell 54. A belt 49 entrained over the rolls 46 and 48 is driven by a motor 51 (FIG. 1). The load cell 54 is wired by conductors 56 to a controller 58 that is in turn wired at 60 to a motor 62 which drives the pump 16 to thereby meter the vegetable oil to the drum in proportion to the flow of the product over the belt 49 into the drum 24. A motor 64 is connected by a belt 66 to roll 28 to rotate the drum 24 at a proper speed, e.g. 20 r.p.m., to partially elevate the pieces 40 on one side of the drum while allowing them to tumble back by gravity to the bottom of the drum thereby evenly distributing the coating liquid which forms a thin layer at 68 on the inside surface of the drum and over the surface of the pieces 40. A radiant heater such as an elongated infrared heater 70 is mounted in a fixed position adjacent to the outside surface of the drum 24 upon a stand 72. One suitable heater consists of a 1 k.w. Calrod heater about 48 inches in length placed an inch from the outside surface of the drum. The drum is painted with a black paint to maximize heat transfer and the wall 74 of the drum is formed from a heat conductive material such as stainless steel. The thermoplastic coating occupies only a small fraction of the volume of the drum. In general the coating occupies less than 1/3 of the volume of the drum but usually less than 1/10 of its volume. The term "small fraction" as used herein means less than 1/3 of the volume of the drum. By filling the drum to only a small fraction of its volume and by permitting natural convection of air through the open ends of the drum, the heating of the pieces 40 can be reliably held to a minimum and the pieces 40 can thus be kept at a much lower temperature than the thermoplastic coating.

By reference to FIG. 3, it will be seen that the heat supplied by the heater 70 heats the outside surface of the drum to about 150° F. while the vegetable oil layer 68 may be slightly lower e.g. about 149° F. In this way, the reduced surface area contact between the surfaces of the pieces and the inside wall of the drum 24 will minimize heat transfer to the pieces themselves and the internal temperature of the pieces may remain at about 70° F. while only the outside surface reaches an elevated temperature, e.g. about 125° F. This allows a substantially continuous film of the thermoplastic liquefied coating to be distributed over the surface of each piece. In this way, the coating can be uniformly applied over the surface of each piece in the amount of about 5% by weight ±5% of the coating by weight. The pieces are moreover protected from excessive heating because the relatively cool internal temperature of the pieces is preserved in a typical transit time with the drum 24 of about 30 seconds. Because the thermoplastic coating will solidify on the surface of the pieces, excess coating material will not be lost from the outlet end 36 of the coating drum 24.

The invention will be better understood by reference to the following examples.

EXAMPLE 1

Simulated nut meats are coated with a hydrogenated vegetable oil having a melting range of from 125° to 145° F. by feeding the oil to the coater at the rate of 5 lbs./min. The coater has a diameter of 18 inches and a length of 4 feet. The motor 64 is run so as to turn the drum at a speed of 20 r.p.m. and the heater maintains the inside surface of the drum at about 150° F. With a dwell time of 30 seconds the interior of each piece is substantially less than the exterior. The coating material solidifies on the surface of the pieces within the drum as uniform substantially homogenous coating. The coating is almost invisible but may be seen upon close examination as a somewhat cloudy film.

EXAMPLE 2

Raisins are coated as described in Example 1.

EXAMPLE 3

Prunes are coated as in Example 1.

EXAMPLE 4

Chopped walnuts are coated as described in Example 1.

EXAMPLE 5

Caramels which have been chilled prior to coating to about 40° F. are coated as described in Example 1.

EXAMPLE 6

Analgesic tablets are coated as in Example 1.

EXAMPLE 7

Antibiotic tablets are coated as in Example 1.

What is claimed is:

1. A continuous process for applying a thermoplastic edible coating material to a food product comprising:
   (a) providing the food product at a selected temperature,
   (b) feeding the food product to a coating zone,
   (c) supplying the thermoplastic coating material to the coating zone in an amount sufficient to fill only a small fraction of the volume of the coating zone,
   (d) applying heat to the exterior of the coating zone to transmit heat to the interior thereof by conduction so that the thermoplastic coating material is maintained in a liquid consistency and at a temperature higher than that of the food product, said thermoplastic coating material forming a layer within the coating zone,
   (e) agitating the food product in the layer of the thermoplastic coating material whereby the liquefied coating material is spread over the surface of the food product to form a coating therefor and
   (f) controlling the dwell time of the food product in the coating zone so that the food product will not be heat-damaged during the coating process.

2. The process of claim 1 wherein the thermoplastic coating material is a normally solid edible fat.

3. The process of claim 1 wherein the thermoplastic coating material comprises an edible fat, said edible fat being heated to a liquid consistency prior to being supplied to the coating zone and both said food product and said coating material are supplied continuously to the coating zone at a controlled rate.

4. The process of claim 1 wherein the temperature of the food product is sufficiently low to congeal the liquid coating material upon the surface of the food product.

References Cited

UNITED STATES PATENTS

| | | | |
|---|---|---|---|
| 3,101,040 | 8/1963 | Lanz | 118—19 |
| 3,517,644 | 6/1970 | Baer | 118—303 |
| 3,451,375 | 6/1969 | Martin | 118—19 |
| 2,909,435 | 10/1959 | Watters et al. | 99—168 |
| 2,742,364 | 4/1956 | Neumann | 99—168 |
| 3,046,143 | 7/1962 | Lowe et al. | 99—168 |
| 3,607,313 | 9/1971 | Roth | 99—166 |

MORRIS O. WOLK, Primary Examiner

S. MARANTZ, Assistant Examiner

U.S. Cl. X.R.

117—109; 118—19, 303, 418; 424—16, 38; 426—93, 99, 310